United States Patent [19]

Thompson et al.

[11] Patent Number: 5,468,053
[45] Date of Patent: Nov. 21, 1995

[54] ENERGY ABSORBING BEAM CONSTRUCTION FOR USE WITH VEHICLE SEAT BELT RESTRAINING SYSTEMS

[75] Inventors: Kurt P. Thompson, Richmond; Jeffrey W. Wiese, Glen Allen, both of Va.

[73] Assignee: Reynolds Metals Company, Richmond, Va.

[21] Appl. No.: 237,909

[22] Filed: May 4, 1994

[51] Int. Cl.⁶ .......................... A62B 35/00; A62B 35/04; B60R 22/14

[52] U.S. Cl. .............. 297/472; 297/216.13; 297/452.18; 188/371

[58] Field of Search .................. 297/216.13, 452.18, 297/472, 483, 484; 280/805; 188/371, 373

[56] References Cited

U.S. PATENT DOCUMENTS

| | | |
|---|---|---|
| 2,442,375 | 6/1948 | Paxton . |
| 2,701,693 | 2/1955 | Nordmark et al. . |
| 2,947,353 | 8/1960 | von Wimmersperg . |
| 3,289,792 | 12/1966 | Moberg . |
| 3,429,613 | 2/1969 | Rice . |
| 3,451,719 | 6/1969 | de Lorean . |
| 3,464,751 | 9/1969 | Barecki et al. . |
| 3,561,817 | 2/1971 | Needham et al. . |
| 3,762,505 | 10/1973 | Morse . |
| 3,802,737 | 4/1974 | Mertens . |
| 3,973,650 | 8/1976 | Nagazumi . |
| 4,005,765 | 2/1977 | Rilly . |
| 4,027,905 | 6/1977 | Shimogawa . |
| 4,076,306 | 2/1978 | Satzinger . |
| 4,192,545 | 3/1980 | Higuchi et al. . |
| 4,381,086 | 4/1983 | Pfeiffer . |
| 4,674,801 | 6/1987 | DiPaola et al. . |
| 4,738,485 | 4/1988 | Rumpf . |
| 4,997,233 | 3/1991 | Sharon . |

*Primary Examiner*—Peter R. Brown
*Assistant Examiner*—Anthony D. Barfield
*Attorney, Agent, or Firm*—Alan M. Biddison

[57] ABSTRACT

An energy absorbing beam construction for use in vehicle seat belt restraining systems includes an energy absorbing beam which is mounted or fastened to a vehicle frame or vehicle seat frame. The seat belt retracting mechanism or belt buckle end of the seat belt restraining system can then be mounted to the energy absorbing beam. In use, when the vehicle is subjected to a head-on collision, the energy absorbing beam deforms elastically at collision speeds less than a target speed and deforms plastically at speeds greater than this to minimize injury to a vehicle occupant that may occur as a result of seat belt restraint.

16 Claims, 3 Drawing Sheets

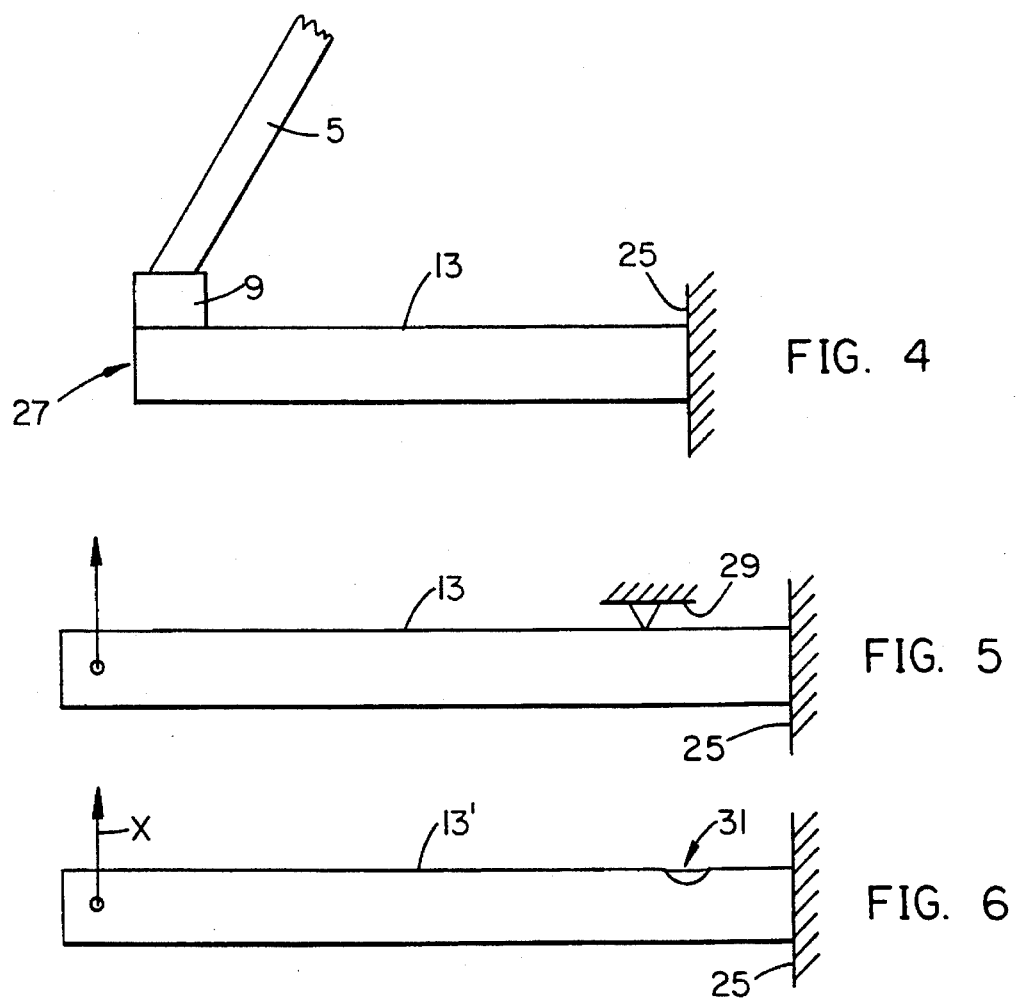
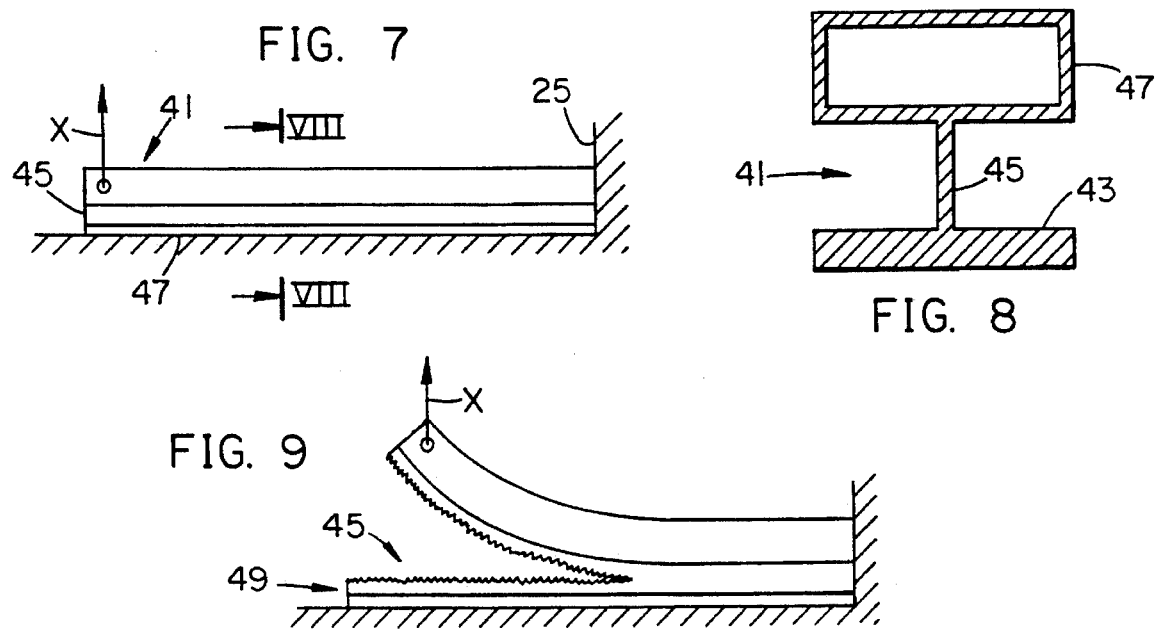

ENERGY ABSORBING BEAM CONSTRUCTION FOR USE WITH VEHICLE SEAT BELT RESTRAINING SYSTEMS

FIELD OF THE INVENTION

The present invention is directed to energy absorbing beam construction for use with vehicle seat belt restraining systems and, in particular, to a beam construction designed to yield elastically and then collapse when subjected to head-on collision forces to minimize vehicle occupant injury.

BACKGROUND ART

The use of seat belt restraining systems in vehicles for occupant restraint is well known in the prior art. In fact, many jurisdictions have enacted legislation requiring vehicle drivers or passengers to use seat belt restraining systems during vehicle operation.

One of the problems with seat belt restraining systems is injury to a vehicle occupant as a result of the restraining force of the seat belt rather than a vehicle collision. The force of a collision, particularly a head-on collision, pushes the vehicle occupant forward against the seat belt which is unyielding by virtue of its inertia locking or restraining system. The unyielding nature of the seat belt can cause injuries to the chest area of the vehicle occupant.

To overcome this problem, the prior art has devised different types of energy attenuating or energy absorbing devices in vehicle restraint systems.

In U.S. Pat. No. 4,674,801 to DiPaola et al., an energy absorber having a limited stroke is disclosed for use in a safety restraint system. The energy absorber includes a length of cable which is wound through a tubular ferrule, the cable including stop means on ends thereof. During a collision, the cable is pulled through the ferrule to absorb crash energy.

U.S. Pat. No. 3,289,792 to Moberg discloses an apparatus for absorption of energy from a moving load. The apparatus includes a shearing apparatus which provides a material to be shorn and plastically deformed for energy absorption.

U.S. Pat. No. 4,076,306 to Satzinger discloses a vehicle seat rest having a deformable section therein. The deformable section is made part of a rectangular seat frame and deforms under the influence of certain side forces.

However, these types of prior art devices are disadvantageous since they require complex mechanical arrangements that require interaction amongst various components and are costly to manufacture. Moreover, certain devices do not adequately dissipate or absorb energy in head-on collisions.

As such, a need has developed to provide an improved energy absorbing device for seat belt restraining systems that is low in cost, easy to manufacture and provides a safe and effective way to absorb energy during a head-on collision.

In response to this need, the present invention provides an energy absorbing beam for use with vehicle seat belt restraining systems that overcomes the drawbacks of prior art devices and provides effective energy dissipation when mounted to a seat or vehicle during head-on collisions.

SUMMARY OF THE INVENTION

Accordingly, it is a first object of the present invention to provide a energy absorbing beam construction which minimizes injury that may occur to a vehicle occupant due to a seat belt restraining system.

It is another object of the present invention to provide an energy absorbing beam that can be mounted either to a vehicle seat frame or the vehicle itself for energy absorption.

A still further object of the present invention is to provide an energy absorbing beam that will elastically yield during head-on collisions at low speeds and plastically deform in a head-on collision at higher speeds (mph) based upon a given vehicle occupant.

Other objects and advantages of the present invention will become apparent as a description thereof proceeds.

In satisfaction of the foregoing objects and advantages, the present invention provides an improvement in vehicles having seats and seat belt restraining systems associated therewith. The present invention includes an energy absorbing beam construction for use with these types of seat belt restraining systems which comprises an energy absorbing beam, means for attaching the energy absorbing energy beam to a seat belt restraining system and means for securing or fastening the energy absorbing beam to a vehicle or a vehicle seat frame.

In a preferred embodiment, the energy absorbing beam can be attached laterally across the back of a vehicle seat using fasteners such as pins, screws or the like. Alternatively, the energy absorbing beam can be fastened to the vehicle itself. For example, the energy absorbing beam could be bolted, welded or fastened in any known manner to a vehicle frame.

In an alternative embodiment, the energy absorbing beam can be attached to a vehicle seat frame or a vehicle frame in a cantilevered fashion such that only one end of the beam is secured. The beam is designed to provide elastic deformation in a head-on collision up to a target speed. Over this speed, the energy absorbing beam deforms plastically to absorb energy and reduce the peak chest deceleration of a vehicle occupant, thereby decreasing the likelihood of injury to the occupant.

The vehicle beam can include cross sections having areas of reduced thickness or bowed or arcuate wall surfaces to facilitate the plastic deformation. The energy absorbing beam is preferably attached to the seat belt retracting mechanism but can be attached to the belt free end.

BRIEF DESCRIPTION OF THE DRAWINGS

Reference is now made to the drawings of the invention wherein:

FIGS. 4–6 show the energy absorbing beams of the invention in cantilevered arrangements;

FIG. 7 is another embodiment of the energy absorbing beam;

FIG. 8 is a cross-sectional view along the lines VIII—VIII of FIG. 7;

FIG. 9 shows the energy absorbing beam of FIG. 7 in a collapsed state;

DESCRIPTION OF THE PREFERRED EMBODIMENTS

Figure 1:
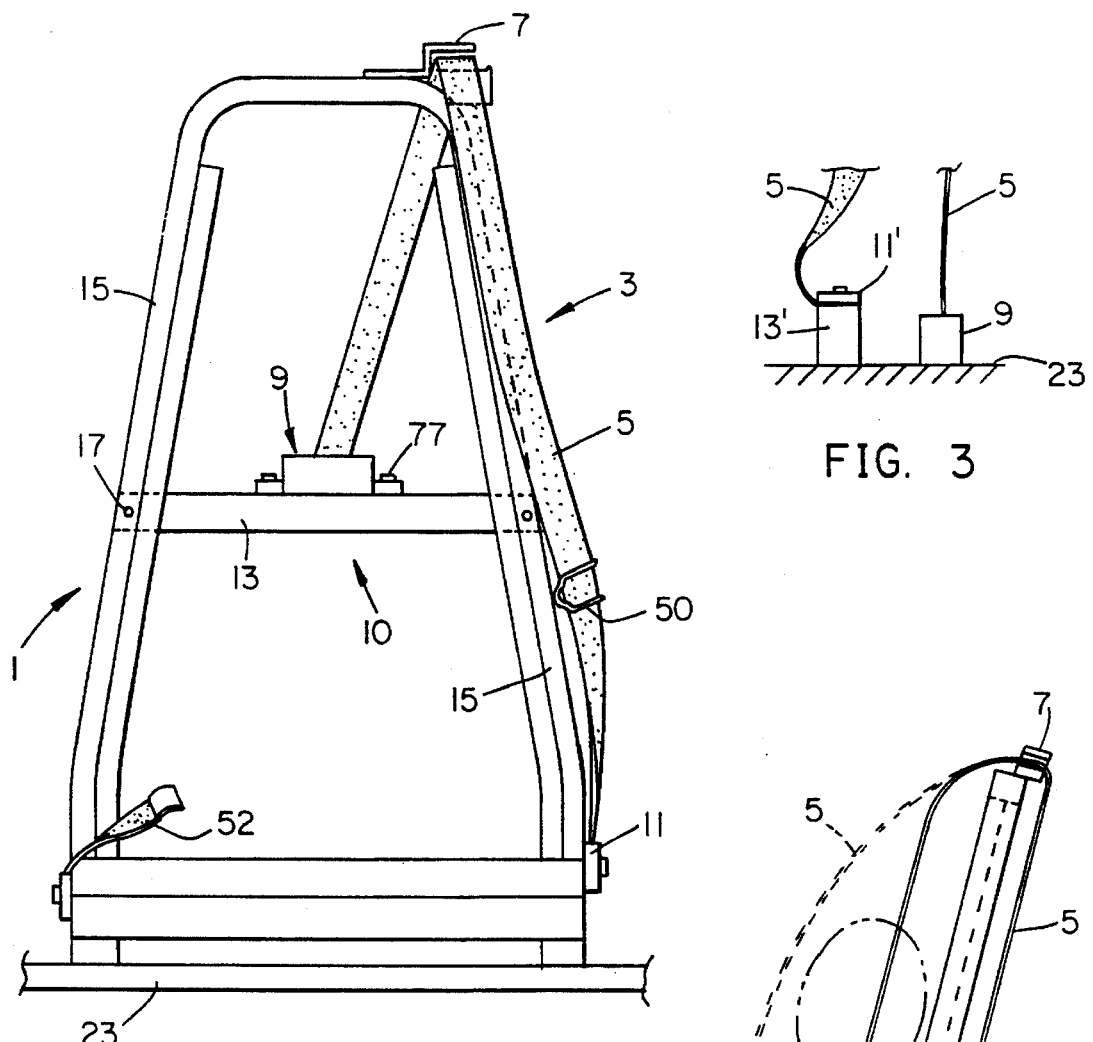
FIGS. 1 and 2 are front and side views of an energy absorbing beam construction according to a first embodiment of the invention.
Figure 2:
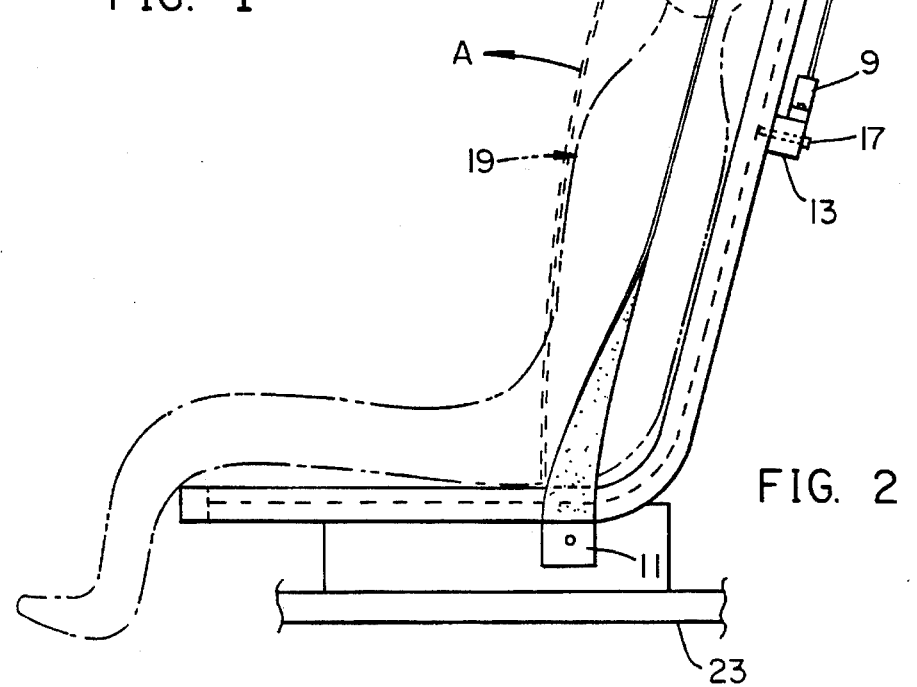

With reference to FIGS. 1 and 2, a first embodiment of the present invention is generally designated by the reference numeral 10 and is seen to include a vehicle seat frame 1 and a seat belt restraining system 3. The vehicle seat frame 1 is typical of these types of seats for use in vehicles such as automobiles. In one type of vehicle seat, the seat belt restraining system 3 is integrated into the vehicle seat rather than being mounted to a portion of the vehicle frame.

The seat belt restraining system 3 includes a seat belt 5, buckle 50, buckle clip 52, a seat belt guide bracket 7 attached to the vehicle seat 1 frame and a seat belt retracting mechanism 9. The seat belt retracting mechanism is well known in the art and a further detailed description thereof is not deemed necessary for understanding of the invention.

The free end of the seat belt 5 is attached to the vehicle seat frame 1 at reference numeral 11. The manner of attachment may be any known means to secure the free end of the seat belt 5 to the frame including fasteners, plate and fastener combinations or the like.

The energy absorbing beam 13 extends laterally across the rear faces of the seat frame members 15. The seat belt retracting mechanism 9 is shown fastened or pinned to the energy absorbing beam 13 via fasteners 77. However, other means for securing or attaching the seat belt retracting mechanism 9 to the energy absorbing beam 13 can be utilized such as screws, clamps, welding, adhesives, combinations thereof or the like. However, the beam 13 can be attached to other parts of the restraining system such as the belt end opposite the retracting mechanism 9.

In the embodiment depicted in FIGS. 1 and 2, the energy absorbing beam 13 is shown pinned to the integrated seat members 15 by pins 17. Again, any known fastening means may be used to secure the energy absorbing beam 13 to the seat frame such as welding, clamping, screws, bolts, combinations thereof or the like.

In use, the energy absorbing beam 13 is pinned, fastened or secured to the seat frame members 15 to minimize injury to a vehicle occupant 19 during a head-on collision. During a head-on collision, with reference to FIG. 2, the vehicle occupant 19 will surge forward as indicated by the arrow A against the restraining force of the seat belt 5 shown in cross hatch. Up to a certain speed, the energy absorbing beam 13 will elastically deform by the force transmitted thereto via the seat belt retracting mechanism 9. When the head-on collision exceeds the certain speed, the energy absorbing beam will collapse to absorb collision energy, still restrain the vehicle occupant 19 based upon a 95 percentile male occupant, (generally a 230 lb. male) and minimize or prevent injury to the vehicle occupant, especially in the chest and sternum area.

Current government regulations specify that seat belt restraining systems should be capable of restraining a vehicle occupant in a 35 mile per hour (mph) collision based upon a 95 percentile male occupant, (generally a 230 lb. male). Thus, the energy absorbing beam of the present invention can be configured to plastically deform at a 35 mph head on collision speed for a 95 percentile male occupant. However, the energy absorbing beam can also be configured to plastically deform at lower or higher speeds than the 35 mph target discussed above and for other types of vehicle occupants such as, e.g., a 100 lb. female.

The energy absorbing beam can be readily configured by one knowledgeable with respect to calculating energy absorption and plastic deformation of materials. Energy absorption is usually characterized by the integral of the beam straining force with respect to the beam displacement or deflection. Thus, the energy absorbed by the beam's plastic deformation can be tailored to a target condition based upon a specified head-on collision speed and particular vehicle occupant to achieve the desired reduction in energy transfer to the vehicle occupant. Energy absorption calculations with respect to the energy absorbing beam for a given head-on collision speed and vehicle occupant weight are well known to one skilled in the art. For example, an energy absorbing beam can be configured to plastically deform in a 15 mph head-on collision for a 150 lb. male or, alternatively, a 20 mph head-on collision for a 100 lb. vehicle occupant. Of course other speeds up to and greater than 35 mph can be utilized for beam configuration.

It should be understood that the energy absorbing beam 13 can be mounted at other locations on the seat frame 1.

Figure 3:
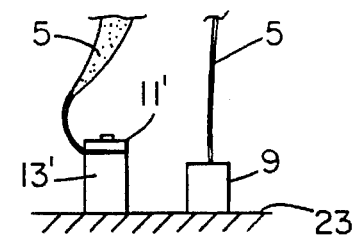
FIG. 3 is a partial schematic representation of a second embodiment of the present invention.

With reference to FIG. 3, an alternative embodiment of the invention shows the free end of the seat belt 5 fastened to the energy absorbing beam 13 at reference numeral 11'. Likewise, the seat belt retracting mechanism 9 is secured to the vehicle frame 23 by appropriate fasteners or the like.

In a further embodiment of the present invention, with reference to FIG. 4, the energy absorbing beam 13 can be secured to a support 25 in a cantilevered fashion such that the beam 13 has a free end 27 thereof. The support 25 can be either a portion of the vehicle seat frame 1 or the vehicle frame 23. In this embodiment, the seat belt retracting mechanism 9 is attached to the energy absorbing beam 13 at the free end 27 thereof. In use, the energy absorbing beam 13 would be subjected to the collision energy transmitted through the seat belt 5 at the free end thereof.

FIGS. 5 and 6 show alternative cantilevered arrangements which facilitate the initiation of collapse of the energy absorbing beam when subjected to a head-on collision exceeding 35 mph. In FIG. 5, a rigid obstruction 29 is provided, either attached to the vehicle frame or vehicle seat frame. The rigid obstruction 29 would come into contact with beam 13 after a set displacement occurs and has the added advantage that it does not affect the beam under small loads, e.g., slow head-on collisions.

In FIG. 6, a dent or recess 31 is introduced into the top of the beam 13 which faces the force exerted by the seat belt restraining system, represented by the arrow X. The dent 31 would cause a localization of stresses and initiate the bending collapse when the collision occurs at speeds over 35 mph.

FIGS. 7–9 show yet another embodiment of the energy absorbing beam. In FIGS. 7 and 8, an energy absorbing beam 41 has a base section 43, web 45 and top section 47, which is rectangular in cross section. The beam 41 can be secured to the support 25 by any known means such as welding, fastening or the like. With reference to FIG. 9, in a strong collision, the force X is large enough to begin to rip the web 45 starting at the distal end 49 thereof. The vehicle occupant's injury is thus reduced due to the energy required to rip the web material and deform the beam section 47.

Figures 10, 11, 12, 13, 14:
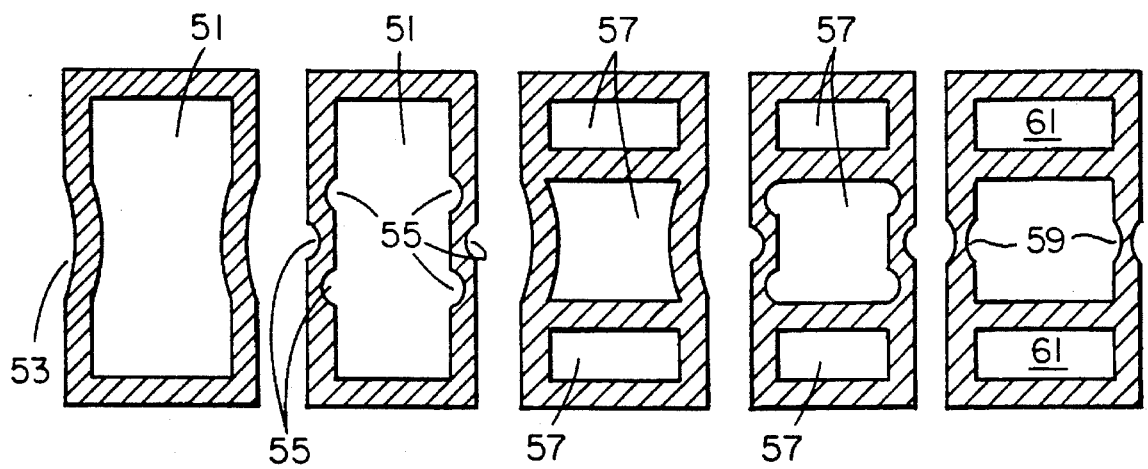
FIGS. 10–14 depict cross-sectional views of alternative embodiments of the energy absorbing beam of the invention.

FIGS. 10–14 show various possible cross sections for the energy absorbing beams described above. FIGS. 10 and 11 show a single void 51 therein with bowed-in sides 53 or reduced thickness sections 55. Each of the configurations are designed to collapse inwardly as the beam is bent.

FIGS. 12 and 13 are similar in nature to FIGS. 10 and 11 but include multiple voids 57 therein. It is believed that these multiple void shapes provide increased strength over the single void designs of FIGS. 10 and 11 and, therefore, may allow a similar function using less material.

Finally, referring to FIG. 14, another multi-void shape also includes a reduced thickness section 59 in the side walls thereof. These reduced sections 59 are sized to fail in or to do shear during a fast collision. Thus, less energy would be imparted to the vehicle occupant due to the need to break the metal and the top and bottom closed sections 61 would further reduce deceleration as they are deformed.

Figure 15:
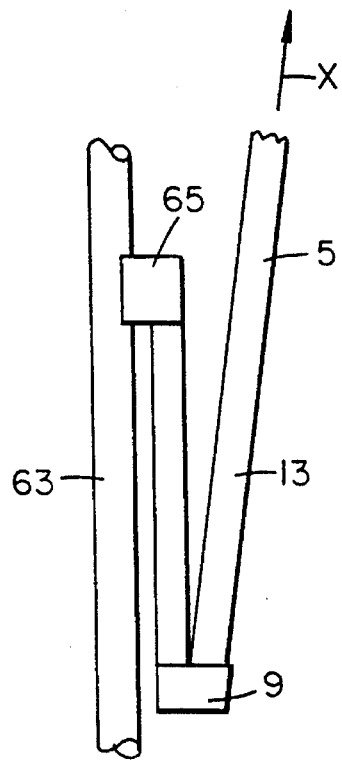
FIG. 15 shows the energy absorbing beam in yet another embodiment.
Figure 16:
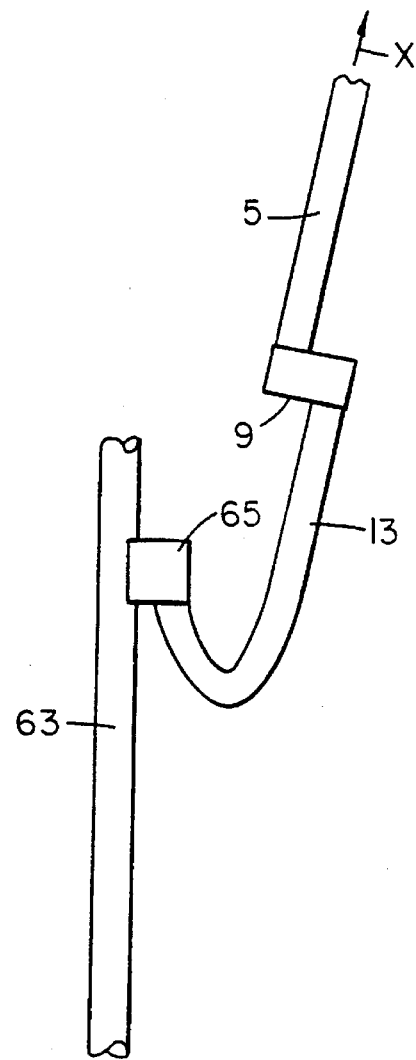
FIG. 16 shows the energy absorbing beam of FIG. 15 in a collapsed state.

FIGS. 15 and 16 show another embodiment of the invention wherein the energy absorbing beam 13 is attached to a rigid support such as the vehicle seat frame member 15 via a rigid coupling 65. When the seat belt 5 is subjected a collision force X, the energy absorbing beam deforms plastically as shown in FIG. 16 to minimize injury to the vehicle occupant.

The energy absorbing beam can be made out of any material but is preferably formed from aluminum or an alloy such as 5000 or 6000 series aluminum alloys. More preferably, the beam is an aluminum extrusion which is readily adaptable to make the multi-void and bowed or reduced thickness cross sectional sections shown in FIGS. 10–14. However, steel or other non-metallic materials may be used in the beam construction As such, an invention has been disclosed in terms of preferred embodiments thereof which fulfills each and every one of the objects of the present invention as set forth hereinabove and provides an energy absorbing beam construction for use in vehicle seat belt restraining systems.

Of course, various changes, modifications and alterations from the teaching of the present invention may be contemplated by those skilled in the art without departing from the intended spirit and scope thereof. Accordingly, it is intended that the present invention only be limited by the terms of the appended claims.

What is claimed is:

1. In a vehicle having at least one seat and at least one seat belt restraining system therefore, the seat belt restraining system comprising a belt and a seat belt retracting mechanism, the improvement comprising an energy absorbing beam construction for use with the seat belt restraining system which comprises:
   (a) a longitudinally-extending energy absorbing beam having a first end and a second end;
   (b) means for attaching the first end of said energy absorbing beam to a component of the seat belt restraining system; and
   (c) means for fastening the second end of said energy absorbing beam to said vehicle so that said second end is fixed and said first end is free to move transversely to a longitudinal axis of said beam when a force is applied to said first end by said seat belt restraining system;
   (d) wherein said energy absorbing beam is a longitudinally extending hollow beam having sides thereof configured to provide controlled plastic deformation of the beam, said free end of said beam moving and said beam deforming elastically when forces less than a given magnitude are exerted on said free end by said seat belt restraining system and said beam deforming plastically in a controlled manner when forces greater than the forces of the given magnitude are exerted on said free end by said seat belt restraining system to absorb collision energy and minimize injury to a vehicle occupant using said seat belt restraining system.

2. The energy absorbing beam construction of claim 1, wherein said seat is a vehicle seat frame secured to said vehicle and said component of seat belt restraining system is fastened to said vehicle seat frame, said means for fastening said energy absorbing beam to said vehicle further comprising means for fastening said second end of said energy absorbing beam to said seat frame.

3. The energy absorbing beam construction of claim 2 wherein said energy absorbing beam is attached at said second end to said seat frame to form a cantilevered beam arrangement.

4. The energy absorbing beam construction of claim 1 wherein said second end of said energy absorbing beam is fastened to a frame component of said vehicle.

5. The energy absorbing beam construction of claim 1 wherein said energy absorbing beam is an extrusion having a multi-void cross-sectional shape.

6. The energy absorbing beam construction of claim 1 wherein said energy absorbing beam has reduced thickness sections in walls thereof to facilitate said plastic deformation.

7. The energy absorbing beam construction of claim 1 wherein said energy absorbing beam has curved wall sections to facilitate said plastic deformation.

8. The energy absorbing beam construction of claim 1 wherein said means for attaching further comprises fasteners.

9. The energy absorbing beam construction of claim 1 wherein the component of said seat belt restraining system fastened to said energy absorbing beam is said seat belt retracting mechanism.

10. The energy absorbing beam construction of claim 9 wherein said energy absorbing beam has a dent in a portion thereof to facilitate said plastic deformation.

11. The energy absorbing beam construction of claim 9 further comprising a rigid obstruction mounted to said vehicle and positioned near said one end of said energy absorbing beam to facilitate said plastic deformation.

12. The energy absorbing beam construction of claim 9 wherein said energy absorbing beam is fastened to said vehicle using a rigid coupling.

13. The energy absorbing beam construction of claim 1 wherein said energy absorbing beam is fastened to said vehicle using a rigid coupling.

14. The energy absorbing beam construction of claim 1 wherein said means for fastening further comprises welding.

15. The energy absorbing beam construction of claim 1 wherein said energy absorbing beam further comprises a flange and a hollow portion interconnected to said flange by a web, said web facilitating said plastic deformation.

16. The energy absorbing beam construction of claim 1 wherein said beam is aluminum.

* * * * *